United States Patent
Bruso et al.

(10) Patent No.: US 7,149,766 B1
(45) Date of Patent: Dec. 12, 2006

(54) METHODS FOR DETECTING OVERFLOW AND/OR UNDERFLOW IN A FIXED LENGTH BINARY FIELD

(75) Inventors: Kelsey L. Bruso, Minneapolis, MN (US); James M. Plasek, Shoreview, MN (US); Rachel M. Noack, McFarland, WI (US)

(73) Assignee: Unisys Corporation, Blue Bell, PA (US)

( * ) Notice: Subject to any disclaimer, the term of this patent is extended or adjusted under 35 U.S.C. 154(b) by 689 days.

(21) Appl. No.: 10/292,131

(22) Filed: Nov. 12, 2002

(51) Int. Cl.
*G06F 7/38* (2006.01)

(52) U.S. Cl. .................................... 708/552
(58) Field of Classification Search ................ 708/552
See application file for complete search history.

(56) References Cited

U.S. PATENT DOCUMENTS

| | | | | |
|---|---|---|---|---|
| 5,197,022 | A * | 3/1993 | Ushiki et al. ............... | 708/552 |
| 5,508,951 | A * | 4/1996 | Ishikawa ..................... | 708/552 |
| 5,974,540 | A * | 10/1999 | Morikawa et al. .......... | 712/221 |
| 2001/0025292 | A1* | 9/2001 | Denk et al. .................. | 708/550 |
| 2004/0098439 | A1* | 5/2004 | Bass et al. ................... | 708/552 |

OTHER PUBLICATIONS

Hennessy, John L., et al., "Computer Architecture; A Quantitative Approach," Second Edition, Morgan Kaufmann Publishers, San Francisco, CA., 1996, pp. A15-A16.
Hennessy, John L., et al., "Computer Organization & Design; The Hardware/Software Interface," Morgan Kaufmann Publishers, San Francisco, CA., 1994, p. 178.
Stein, Marvin L., et al., "Introduction to Machine Arithmetic," Addison-Wesley Publishing Company, Reading, Massachusetts, 1971, pp. 43-45.
Tanenbaum, Andrew, "Structured Computer Organization," Prentice-Hall, Englewood Cliffs, N.J., 1984, p. 440.

\* cited by examiner

*Primary Examiner*—Tan V. Mai
(74) *Attorney, Agent, or Firm*—Charles A. Johnson; Mark T. Starr; Crompton, Seager & Tufte, LLC

(57) ABSTRACT

Methods of detecting overflow and/or underflow events are provided. The methods are preferably incorporated into a high-level programming language, but this is not necessary. In one embodiment, an increasing function that may cause overflow for a data element having a value is performed on a surrogate variable having the same value as the data element. The variable is then compared to the value to determine whether the variable, after the function is performed, is greater than the value. If the value is greater than or in some cases equal to the variable, an overflow has occurred. If the value is less than the variable, no overflow has occurred. Additional embodiments determine whether an underflow occurs with a decreasing function in similar fashion, and the function may be performed on either the variable or the value.

33 Claims, 5 Drawing Sheets

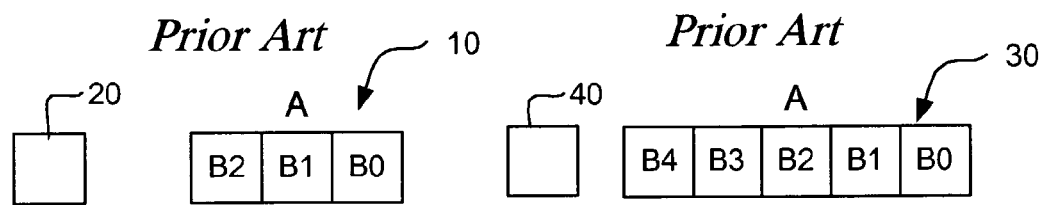
FIG. 1A
FIG. 2A
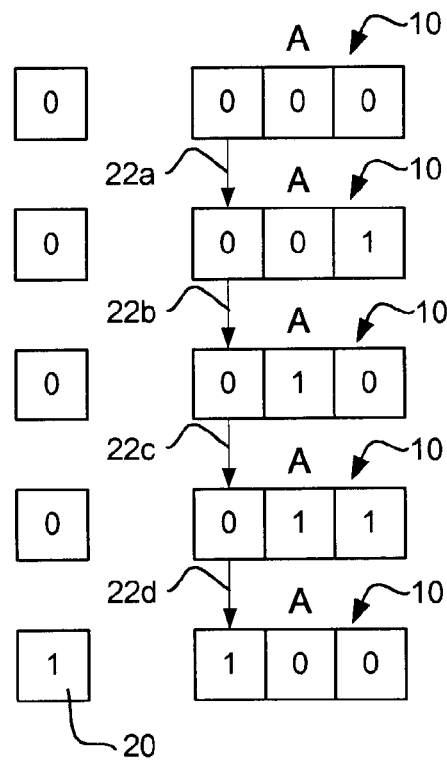
FIG. 1B
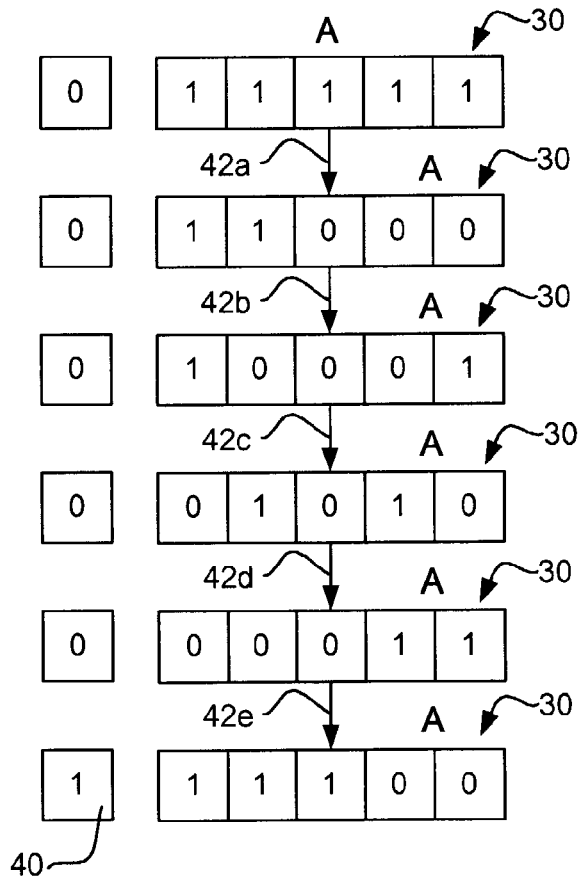
FIG. 2B

METHODS FOR DETECTING OVERFLOW AND/OR UNDERFLOW IN A FIXED LENGTH BINARY FIELD

BACKGROUND

The present invention relates generally to digital data manipulation. In particular, it relates to methods of using software to identify data overflow or underflow. Digital devices have proliferated widely in virtually all areas of technology during the last half century. Data in digital devices is often temporarily stored in blocks such as bytes or words including several individual bits. Such temporary storage is often limited by the size of the registers or other digital storage devices used in hardware. For example, some registers are designed to store a single byte. Where a register is used to store a number, there is a limit to the magnitude (upper or lower bounds) of the number that can be accurately stored. When the upper or lower bounds are exceeded, an overflow (upper bound) or underflow (lower bound) can occur.

In some systems, the hardware is equipped with overflow and/or underflow detection circuitry. In some cases, an overflow flag is set to indicate when a stored value exceeds its upper limit, and an underflow flag is set when a value exceeds its lower limit. The individual flags must typically be polled to determine whether a flag has been set. In other systems, overflow or underflow may be indicated by exceptions or interrupts, which often require special routines for acknowledgement and response. Because overflow or underflow interrupts occur rarely in most applications, testing and troubleshooting procedures for some hardware systems are difficult to implement and often inadequate. Further, multiple interrupt handlers-(used when more than one interrupt occurs in a short time) can be quite complex and are often difficult to design and test.

Still other systems use double length memory libraries or protocols to handle data overflow or underflow. For example, an 8-bit number could be stored in a 16 bit register, and the upper byte (the upper 8 bits) could be polled or monitored to determine whether an overflow or underflow has occurred in the lower byte. Such a protocol, in effect, uses an extra memory location for a variable in order to compensate for a hardware limitation. Further, in some hardware and operating systems, it may not be possible to directly manipulate a double length memory, at least without special coding. When the hardware and operating system can manipulate a double length memory with special coding, the use of the special coding may increase the computational load and the likelihood of program or hardware error. These difficulties and inefficiencies can be further compounded when a data element that is subject to potential overflow is of the largest built-in or standard data type allowed in the hardware. For example, if the largest register in a system is 32 bits, it can be cumbersome to create a data element having more than 32 bits to help prevent data overflow or underflow.

SUMMARY

The present invention relates to methods of using software to identify data overflow or underflow in a data processing system. In one illustrative embodiment, a high-level programming language is used to detect data overflow and/or underflow. To detect an overflow condition, some embodiments are adapted for use with functions that monotonically increase a value, where the value has a finite upper limit, for example, defined by the data space allocated for the value. In one illustrative embodiment, the value is copied into a variable, and the function is performed on the variable. In another illustrative embodiment, the value is copied into a variable, and the function is performed on the value itself. In either case, the variable is compared to the value after the function is performed. If the variable is larger than the value, then no data overflow has occurred, while if the variable is less than the value, it may be determined that a data overflow has occurred. Whether an overflow event has occurred may also be indicated, for example, within a program by calling another function or subroutine, or outside the program by indicating the overflow to a user or recording the event for diagnostic purposes.

To detect underflow, some embodiments are adapted for use with functions that monotonically decrease a value having a finite lower limit, for example, defined by the data space allocated for the value. Like above, and in one illustrative embodiment, the value is copied into a variable, and the function is performed on the variable. In another illustrative embodiment, the value is copied into a variable, and the function is performed on the value itself. In either case, the variable is compared to the value after the function is performed. If the variable is less than the value, then no data underflow has occurred, while if the variable is greater than the value, it may be determined that a data underflow has occurred. Whether an underflow event has occurred may also be indicated, for example, within a program by calling another function or subroutine, or outside the program by indicating the overflow to a user or recording the event for diagnostic purposes.

BRIEF DESCRIPTION OF THE DRAWINGS

FIGS. 1a–1b show a block representation of a prior art overflow event;

FIGS. 2a–2b show a block representation of a prior art underflow event;

DETAILED DESCRIPTION OF SEVERAL EMBODIMENTS

Figure 3:
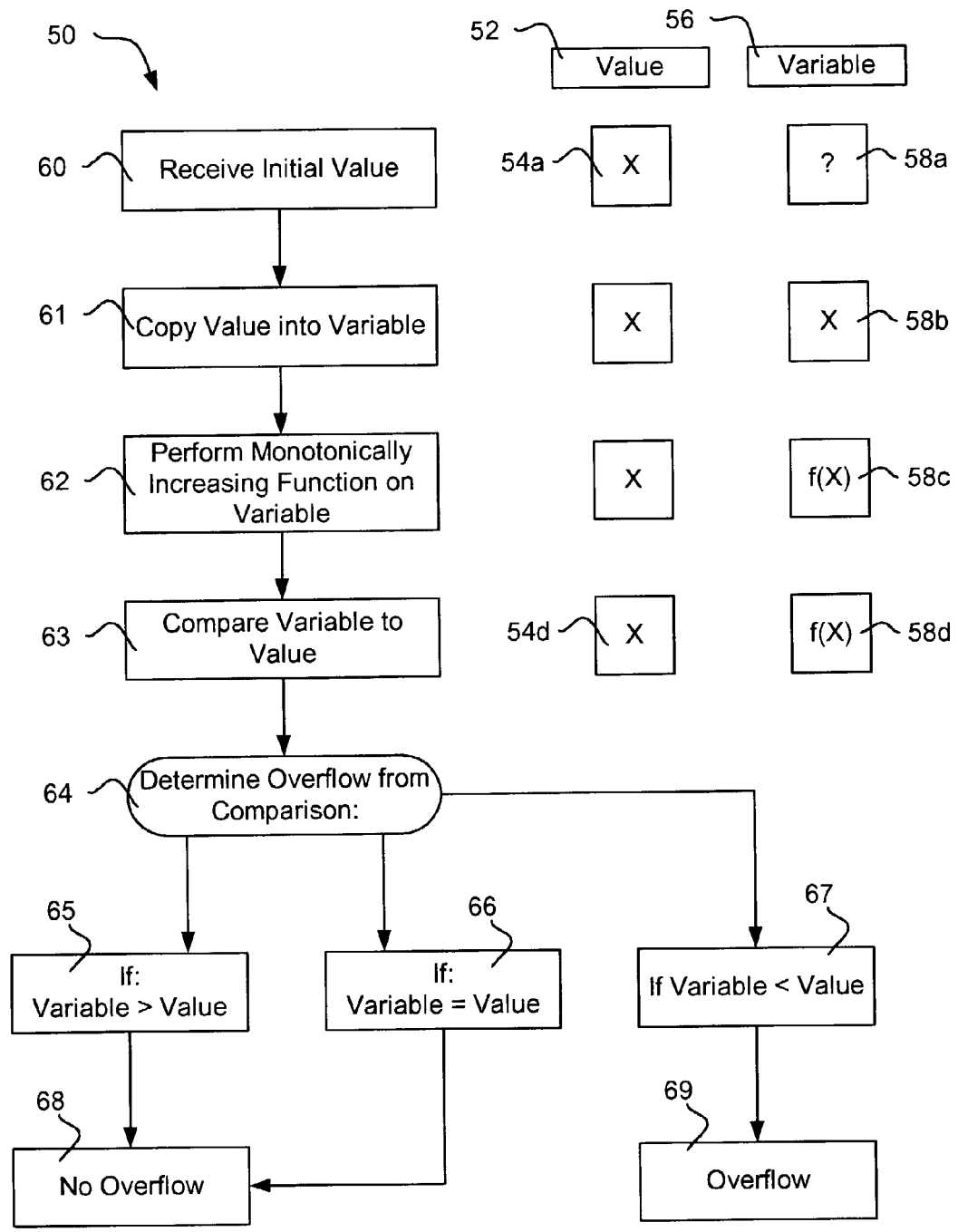
FIG. 3 is a highly diagrammatic block diagram of an illustrative embodiment of the present invention for detecting an overflow event.

FIGS. 1a–1b show a block representation of a prior art overflow event. As shown, data element 10 in register A has three bits B0, B1, B2, each bit containing either a zero or a one in the usual manner. For the illustration, register A stores a value in twos complement notation, such that bits B0 and B1 are data bits while bit B2 is a sign bit where a 0 indicates the value is positive and a 1 indicates the value is negative. An extra bit 20 is also illustrated. The extra bit 20 may represent, for example, a carry bit, an overflow flag, or an overflow interrupt designator, for example. As used in FIGS. 1a–1b, extra bit 20 is an overflow high or carry high bit, such that, when no overflow or carry occurs, the extra bit 20 is a zero.

FIG. 1b illustrates an increasing function (e.g. increment function) performed on the data element 10 in register A. Initially, register A is set to 000; in twos complement notation, register A indicates zero in base ten. A first iteration 22a adds one, such that register A is set to 001 (which is interpreted as one in base ten using twos complement). A second iteration 22b adds one again, such that register A is set to 010 (two in base ten). A third iteration 22c adds one a third time, such that register A is set to 011 (three in base ten). During each of the first three iterations 22a, 22b, 22c, the extra bit 20 remains set to zero.

Because register A is a three bit register, in twos complement notation register A has an upper bound of three and a lower bound of negative four. Thus, fourth iteration 22d, which adds one again, results in an overflow of the register A. Data element 10 in register A, after the fourth iteration 22d, is limited by the size of register A, and instead of containing a twos complement representation of positive four, it contains a twos complement representation of negative four, shown as 100. The represented value is incorrect. In several hardware based overflow detection schemes, an extra bit such as extra bit 20 is used to note the overflow. As shown, extra bit 20 after the fourth iteration 22d contains a one to indicate an overflow has occurred.

The extra bit 20 may be incorporated in several ways. Extra bit 20 may be a carry bit, indicating a carry into the third bit B2. For some hardware configurations, extra bit 20 is provided to indicate that a carry went into the third bit B2 without a carry exiting third bit B2, which would accurately indicate data overflow for summation of two positive twos complement numbers. Likewise, extra bit 20 may indicate that a carry exited third bit B2 without a carry entering third bit B2, which would indicate data underflow in twos complement. These analysis schemes for generating third bit B2 may require additional logic hardware to sample the internal carries occurring during data operations. Such logic hardware can complicate chip design and increase cost both in terms of the time required for an operation to occur as well as cost in terms of chip space, power consumption, heat generation, chip yield, etc. Extra bit 20 may be used to generate an interrupt request, which may be accessed by an interrupt polling scheme to determine that an interrupt has been generated due to an overflow. One difficulty with respect to extra bit 20 in a twos complement scheme is that a carry out of register A does not occur when an overflow occurs. Some hardware schemes may not be configured to enable detection of such an event.

The extra bit 20, interpreted in any of the above ways, often requires either special treatment by hardware or special instruction set libraries to be used. Special treatment by hardware is not included in every hardware configuration. Further, in some hardware configurations, the special treatment may include interrupt schemes, which can have a variety of shortcomings such as, for example, requiring special exception software treatment, and providing occasional problems due to the difficulty of testing multiple or simultaneous interrupt events for troubleshooting purposes.

Another difficulty which can arise in a hardware scheme that relies on register carry events is the possible generation of a false overflow. For example, in twos complement representation using an eight bit register, one could subtract seven from thirty by adding a negative seven to thirty. In the register, one would add 0001 0111 (thirty) plus 1111 1001 (negative seven). The result would be 1 0001 0111, with the register retaining the lower eight bits and, in some hardware schemes, indicating a carry to the discarded one in the ninth bit. Indeed, such a carry would be indicated for any summation of a positive and a negative number in twos complement where the result is positive, as well as any summation of two negative numbers. For example, if the operation of subtracting seven illustrated above were repeated several times, each operation would result in a carry except for the first time that the subtraction results in a negative number. Using a variable X as an example, the following sequence shows the result when seven is subtracted repeatedly from X:

| X | X twos complement | Carry when subtract 7? | Overflow or underflow? |
| --- | --- | --- | --- |
| 30 | 0001 1110 | Yes | No |
| 23 | 0001 0111 | Yes | No |
| 16 | 0001 0000 | Yes | No |
| 9 | 0000 1001 | Yes | No |
| 2 | 0000 0010 | No | No |
| −5 | 1111 1011 | Yes | No |
| −12 | 1111 0100 | Yes | No |

As can be seen, neither the presence nor the absence of the carry accurately indicates data overflow for the above operations occurring in twos complement form. However, some hardware schemes may lack features allowing such underflow or overflow to be detected, and may only be able to indicate whether a carry occurs.

FIGS. 2a–2b show a block representation of a prior art underflow event. As shown in FIG. 2a, register A is a five bit register including data element 30 having five bits B0, B1, B2, B3, and B4. An extra bit 40 is also shown. Register A as illustrated in the example of FIGS. 2a–2b is in unsigned integer format. FIG. 2b illustrates several steps during which a decreasing function (e.g. subtraction function) is applied to the data element 30 in register A. Initially, register A shows 11111, such that data element 30 has a value of thirty-one. A first iteration 42a of the decreasing function subtracts seven from data element 30, leaving register A showing 11000 or a value of twenty-four. A second iteration 42b subtracts seven again, leaving register A showing 10001, for a value of seventeen. A third iteration 42C subtracts another seven, and so does a fourth iteration 42d. After four iterations 42a–42d, register A shows 00011, giving data element 30 a value of 3.

The fifth iteration 42e subtracts seven from three, yielding a negative value which cannot be represented in the unsigned integer format of the illustrative prior art example shown in FIGS. 2a–2b. Therefore, after the fifth iteration, the extra bit 40 changes from a zero to a one (the extra bit 40 is active high). In some alternatives, the extra bit 40 may be an active low bit instead of the active high bit shown. The extra bit may be as noted above with respect to FIGS. 1a–1b. Also, in a double length memory overflow scheme, extra bit 40 may be the lowest bit in a second register, and operations involving register A would be structured so that a second register including extra bit 40 can be included. A double length memory overflow scheme may be implemented, for example, by using libraries specially designed to allow for such double length memory calculations.

The prior art events illustrated in FIGS. 1a–1b and 2a–2b show both overflow and underflow for operations on registers containing twos complement and unsigned integer variables. Similar events can be shown to take place in other binary representations, including, for example, ones-complement, signed and unsigned floating point data, etc. One may also encounter data overflow in operations performed on data representing letters or strings of letters, for example text in a coded character set (such operations can be used, for example, where such data is encoded for security purposes). In such events, it is often the case that a hardware driven exception or a complicated set of library functions must be relied upon to handle such overflow and/or underflow. Further, in several prior art designs, a programmer may be required to provide assembly level code to handle such events. These approaches may represent additional levels of complexity for programmers and/or require hardware specific programs. In some schemes, these approaches can decrease reliability, as handling of multiple exceptions or interrupts, particularly with relatively uncommon events such as data register overflows, may be poorly tested due either to difficulties in creating multiple exception scenarios properly or to a determination that the expense of such testing is not justified by the likelihood of such events.

It may be noted that some mathematical operations, such as greater than, equals, and less than comparisons, can in some languages be performed on data containing text. Often, for example, the statement "A"<"B" will be treated as a true statement, either because the operation may function to recognize alphabetical order, but more likely, because a coded character set binary representation for "A" is, numerically, less than the coded character set binary representation of "B". Some illustrative coded character set representations may include ASCII, EBCDIC, or UNICODE, among others. Therefore, the present methods need not be limited only to use with numerical data elements.

In the description of many of the Figures, it should be understood that the terms value and variable are often used to define two different data items or elements, often of the same data type (e.g. 8 bit unsigned integer). This terminology is not meant to be limiting, but is instead provided to assist in understanding the description by providing names (value and variable) instead of, for example, a "first value" and a "second value." A value is a data item or element used in data processing that occurs during an operation, while a variable is a data item used in several embodiments of the present invention to facilitate data overflow and/or underflow analysis. One could also state a "first value" and a "second value," but such terminology can lead to confusion and may make explanation of some illustrative embodiments more difficult to understand. In some embodiments, the terms initial value and new value are also used, with like intent.

A variable may be considered a surrogate variable for the value in some embodiments where a function is performed on the variable. In other embodiments, the variable stores data from the value while a function is performed on the value. For example, the variable may be a local data element defined for use in a subroutine, while the value may be a global data element defined for use throughout a program. The extent of the data element definitions for the variable and the value may be changed without deviating from the scope and spirit of the present invention. Finally, the following illustrative embodiments are shown in relatively simple schemes, for example, using four and five bit registers. Such data elements are used for the purpose of simplicity of illustration. It should be understood that larger or smaller data element sizes may be used equally well with embodiments of the present invention.

An illustrative embodiment of the present invention includes a method for indicating data errors. The method includes the step of accepting an initial value. The initial value may be of any data type, and should be of a magnitude that can be represented by the underlying hardware without creating a data underflow or overflow. The method further includes generating a new value by applying a function to the initial value. The function may be an increasing or decreasing function, for example, one of the functions further detailed below with reference to FIGS. 3 and 4. The illustrative method also includes comparing the new value to the initial value. The type of comparison may include determining whether the new value is greater than, greater than or equal to, less than, or less than or equal to, the initial value. The particular comparison that is used may depend on the particular needs of the programmer, as well as the type of function used.

Additionally, the illustrative method includes determining from the comparing step whether a data error has occurred. The data error may include such events as data overflow or data underflow, for example. If a data error has occurred, the method may include providing an appropriate data error indication. The data error indication may include, for example, a return from subroutine which is routed to a second subroutine for handing a data error or adjusting a program to work around the data error. The data error indication may also include a notification to a user, such that a user of a device becomes aware of the potential data error. The data error may be prevented or it may simply be recorded, depending on the application. The data error may also be indicated to a remote individual such as a network administrator, performance monitor, or maintenance personnel.

In other embodiments, the present methods may be used to predict an impending data error, and may, for example, temporarily or permanently disable error flags, exceptions, or interrupts that would otherwise occur so that particular types of data errors may be ignored. In some embodiments, the present invention may be used to prevent hardware difficulties related to poorly modeled or defective flags, exceptions or interrupts from hampering the use of software. For example, a user may determine that the data underflow/overflow flags are unreliable in a particular device, either due to defect, poor design, poor testing, or simply because documentation for the device is unavailable. For such a user, the present invention may allow continued use of the device without requiring reliance on the data underflow/overflow flags built into the hardware.

FIG. 3 is a highly diagrammatic block diagram of an illustrative embodiment of the present invention for detecting an overflow event. In some embodiments, the illustrative embodiment may be implemented using a high level language, such as C, C++, Java, FORTRAN, Basic, Pascal, etc. Implementations of the present invention, however, need not be limited merely to such high level software languages. For example, in some embodiments the present invention may be implemented using an instruction set assembled for a microcontroller. Furthermore, while the present invention is presented herein with reference to a high level language, it should be understood that assembly code or machine code representations may also be used without deviating from the scope and spirit of the invention.

With reference to FIG. 3, the illustrative diagram 50 shows a column for a value 52 and a variable 56. In some embodiments, value 52 is defined or taken in an ongoing program, such as a subroutine or callable function included in another program. A first step 60 of the illustrative method receives a value 52. The value is received and shown in value column 52 as X 54a. In the illustrative example, the value is preserved throughout the method, as shown in value column 52 where value remains as X from 54a to 54d. The variable 56 is initially unknown as shown 58a, or set to an known initial value. The second step 61 of the method copies the value 52 into the variable 56, such that the variable 56 becomes X as shown 58*b*.

The third step 62 in the illustrative example 50 function on the variable. In some embodiments, the function may be a monotonically increasing function. In additional embodiments, the function may be an arbitrarily chosen function, such as an increment function, a multiplicative or exponential function, addition of a constant value, addition of a varying value, combinations of these functions, or other functions causing an increase in a data element upon which the function is performed. For example, the function may be a function that, in the absence of a data error, accepts an initial value and returns a new value that is greater than the initial value. In other embodiments, the function may be any function that, in the absence of a data error, accepts an initial value and returns a new value that is greater than or equal to the initial value. The monotonically increasing function "f" should, however, not cause a change in its argument that exceeds the maximum magnitude that can be stored by the underlying hardware. The result of the monotonically increasing function is stored back into the variable 56 as f(X), as shown 58*c*.

The fourth step 63 in the illustrative example 50 compares the variable 56 to the value 52. Control is then passed to decision step 64. If after the third step 62, variable 56 (f(X) as shown 58*d*) is greater than or equal to the value 52 (still X as shown 54*d*), the decision step determines that there has been no overflow by definition of the function. In this case, the decision block 64 transfers control to step 65, showing "variable>value", which in turn indicates that no overflow occurred, as shown at step 68, or step 66, showing "variable=value," which also indicates that no overflow has occurred again as shown at step 68. If, instead, the variable is less than the value 67, the decision block transfers control to step 69 which indicates that an overflow has occurred.

One possible advantage of the illustrative method 50 is that the value 52 is not itself the data element on which the function is performed. Thus, value 52 is preserved. This may be useful when, for example, the illustrative method 50 is included as part of a larger method or subroutine in which, if an overflow is detected, will use the value 52 in some later operation such as, for example, reducing the value 52 to allow the function to be performed without causing an overflow.

Figure 4:
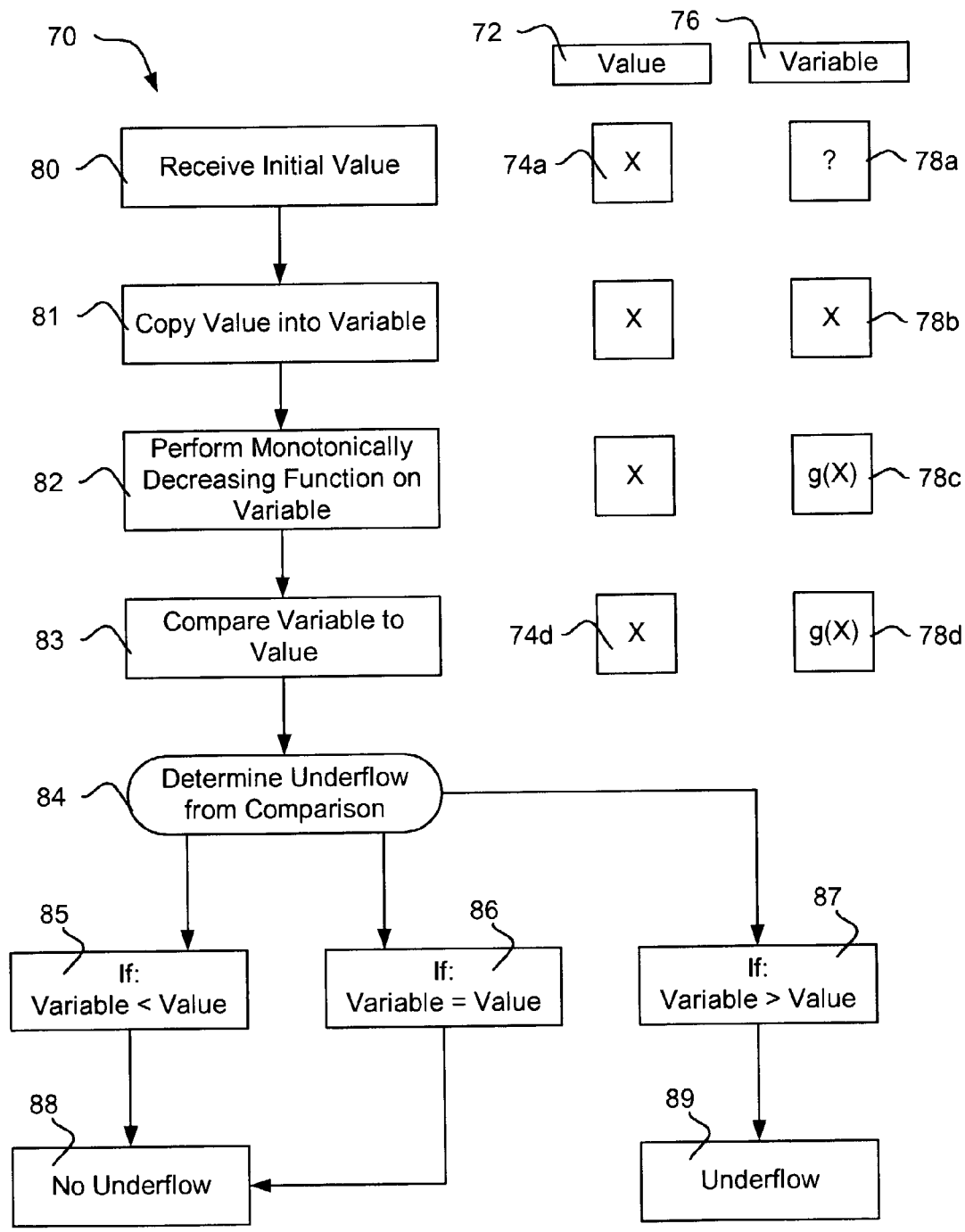
FIG. 4 is a highly diagrammatic block diagram of an illustrative embodiment of the present invention for detecting an underflow event.

FIG. 4 is a highly diagrammatic block diagram of an illustrative embodiment of the present invention for detecting an underflow event. The illustrative embodiment of FIG. 4 is adapted for use with another function, "g". The illustrative method is generally shown at 70, and includes columns for value 72 and variable 76. In the illustrative method 70, the variable 76 is a surrogate for the value 72. Some advantages to using a surrogate variable 76 are noted above.

A first step 80 receives the value 72, which should be an initial data element having a magnitude that can be represented by underlying hardware without generating an overflow or underflow error. As shown, the value 72 is X and is shown at 74*a*. In the illustrative embodiment, the variable 76 and value 72 are of the same data type, but this is not required. The variable 76 is not initialized, hence the "?" at 78*a*. The second step 81 copies the value 72 into the variable 76, thus the variable 76 becomes X at 78*b*. The third step 82 performs the function on the variable 76, hence X in the variable 76 is replaced by g(X) 78*c*. The function may be a monotonically decreasing function. Function "g" may also be an arbitrarily chosen function, such as a decrement function, a division function, subtraction of a constant value, subtraction of a varying value, combinations of these functions, or other functions causing a decrease in a data element upon which the function is performed. For example, the function "g" may be a function which, in the absence of a data error, accepts an initial value and returns a new value that is less than the initial value. In other embodiments, function "g" may be any which, in the absence of a data error, accepts an initial value and returns a new value that is less than or equal to the initial value. For several embodiments, the function "g" should not cause a change in its argument by an amount that exceeds the maximum magnitude that can be stored by underlying hardware.

The fourth step 83 compares the variable 76 to the value 72. Thus, g(X) 78*d* is compared to X 74*d*. The result of the fourth step 83 leads to a decision step 84 in which underflow is determined from the comparison. If the variable 78*d* is less than the value 74*d*, as indicated at 85, or equal to the value 74*d*, as indicated at 86, control is passed to step 88 which indicates that no underflow occurred. If the variable is greater than the value, as indicated at step 87, control is passed step 89 which indicates that an underflow has occurred.

In many respects, the illustrative method 70 in FIG. 4 is quite similar to that of FIG. 3, except that data underflow is predicted rather than data overflow. One reason to view the illustrative methods of FIGS. 3–4 as predicting data overflow is that the functions "f" and "g" are not performed on the value 52, 72, but instead on a surrogate variable 56, 76. This may allow a programmer, in some embodiments, to identify a particular register or hardware element for use as the variable 56, 76 which may allow overflow or underflow in a highly predictable or simple manner without, for example, generating an interrupt or exception. In other embodiments, because two data elements are being compared, without requiring polling of status indicators or flags or without requiring exceptions or interrupts to be generated, the illustrative methods 50, 70 can be implemented using a high level programming language, rather than at an assembly code level, for example. In some embodiments, flags or interrupts for indicating data underflow or overflow may be disabled during subroutines or functions of the sorts illustrated herein.

Given another function "F", this time F being a function which, in the absence of data error, accepts and initial value and returns a value which is greater than the initial value, the following pseudocode provides another illustrative example:

integer x, y;
x=initial value;
y=F(x);
IF y≦x THEN overflow has occurred;

Likewise, given a function "G", this time G being a function which, in the absence of data error, accepts an initial value and returns a value that is less than or equal to the initial value, the following pseudocode provides a further illustrative example:

integer x, y;
x=initial value;
y=g(x);
IF y≧x THEN underflow has occurred;

As can be seen from the above pseudocode, the present invention may provide quite simple, yet effective, overflow and underflow detection/prevention.

Figure 5:
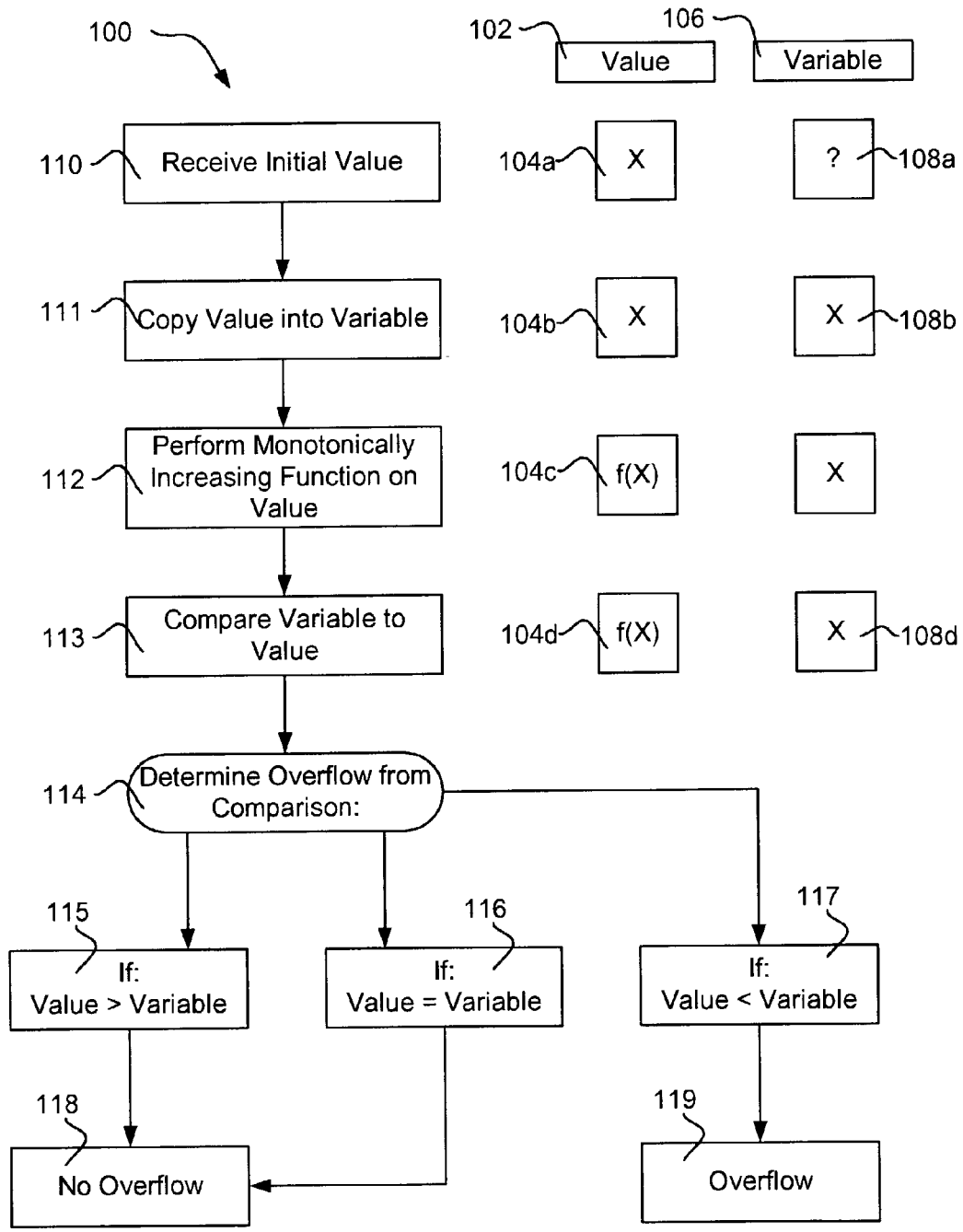
FIG. 5 is a highly diagrammatic block diagram of another illustrative embodiment of the present invention for detecting an overflow event.

FIG. 5 is a highly diagrammatic block diagram of another illustrative embodiment of the present invention for detecting an overflow event. The illustrative method is generally shown at 100, is adapted for use with a monotonically increasing function "f", where f accepts an initial value and, in the absence of data error, returns a value which is greater than or equal to the initial value. Again, columns for a value 102 and a variable 106 are provided. The first step 110 receives a value, which is shown in the value column 102 at 104*a*. The variable 106 is not initialized in the illustrative method, thus the "?" at 108*a*. The second step 111 copies the value 102 into the variable 106, so that X 108*b* replaces the "?" 108*a*. The third step 112 performs the monotonically increasing function on the value. Thus, in the value column 102, f(X) 104*c* replaces X 104*b*. The fourth step 113 compares the variable to the value, thus comparing f(X) 104*d* to X 108*d*. The fifth step 114 determines if an overflow occurred. If the value is greater than or equal to the variable (f(X) 104*d* is greater than or equal to X 108*d*), as shown at steps 115 and 116, then control is passed to step 118 which indicates that no overflow occurred. If, however, if the value is less than the variable 117, as indicated at step 117, respectively, control is passed to step 119 which indicates that an overflow has occurred.

In the illustrative embodiment of FIG. 5, the value is altered by the function, and may be returned to a program using the value, which in some cases, may reduce the data processing required. This method may be contrasted with that illustrated in FIG. 3, where the function is performed on a surrogate variable. Meanwhile, the value initially received, X, is preserved by the variable 106, in case an overflow is detected. In some embodiments, flags or interrupts for indicating data overflow may be disabled during a subroutine or function of the sort illustrated above.

Figure 6:
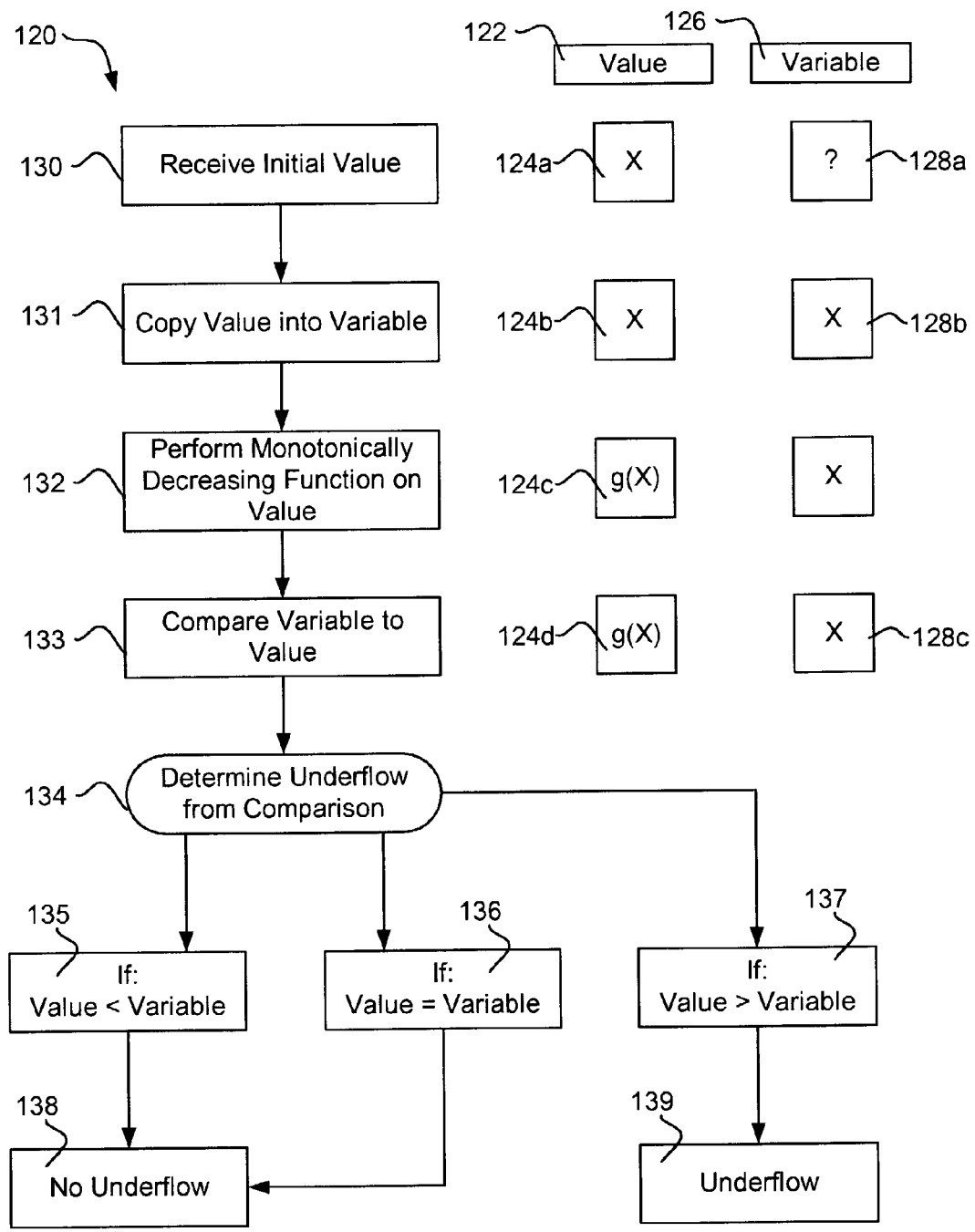
FIG. 6 is a highly diagrammatic block diagram of another illustrative embodiment of the present invention for detecting an underflow event.

FIG. 6 is a highly diagrammatic block diagram of another illustrative embodiment of the present invention for detecting an underflow event. The illustrative method is generally shown at 120, and is adapted for use with a monotonically decreasing function "g", where g is a function which, in the absence of a data error, accepts an initial value and returns a value which is less than or equal to the initial value. Again, columns for a value 122 and a variable 126 are provided. The first step 130 in the illustrative method receives an initial value, denoted X 124*a*. The second step 131 copies the value 122 to the variable 126, such that both columns 122 and 126 now show an X 124*b* and 128*b*, respectively. The third step 132 performs a decreasing function on the value 122, such that g(X) appears 124C in the value column 122. Note that the variable 126 does not change, and is instead used to store the initial value, X.

The fourth step 133 compares the variable X to the value g(X). Decision step 134 determines whether there is an underflow condition. If the value is less than or equal to the variable as shown at 135 and 136, control is passed to step 138 which indicates that no underflow occurred. If, however, the value is greater than the variable 137, as shown at step 137, respectively, control is passed to step 139 which indicates that an underflow has occurred.

Again, several aspects of the illustrative embodiment of FIG. 6 should be noted. First, it is the value that is altered by the function "g". The value itself may thus be easily returned by the code or subroutine, and the function "g" need only be performed once. Meanwhile, the variable preserves the initial value X, in case, for example, there is an underflow as indicated at step 139, in which case it may be desirable to recover the initial value X. In some embodiments, flags or interrupts for indicating data underflow may be disabled during a subroutine or function of the sort illustrated above.

Additional illustrative embodiments follow. Given an increasing function "F", F being a function which accepts an initial value and, in the absence of data error, returns a value which is greater than the initial value, the following pseudocode provides another illustrative example:

integer x, y;
x=initial value;
y=x;
x=F(x);
IF x≦y THEN overflow has occurred;

For a decreasing function "G", G being a function which accepts an initial value and, in the absence of data error, returns a value which is less than the initial value, the following pseudocode provides another illustrative example:

integer x, y;
x=initial value;
y=x;
x=f(x);
IF x≧y THEN underflow has occurred;

As can be seen from the above pseudocode, the present invention may provide quite simple, yet effective, overflow and underflow detection/prevention.

For a floating point format, similar code may be used: For example, float a, b;
a=initial value;
LOOP UNTIL DONE
b=a;
a=(a+0.2)*1.02;
IF a<b THEN overflow has occurred;
END LOOP As shown, the increasing function combines both addition and multiplication. Polynomial, exponential or other functions may be likewise used and/or combined as desired.

Another illustrative embodiment is shown in the following simple generic pseudocode:

Define M, N as DATA TYPE;
Define RAND, a random number greater than or equal to zero, as DATA TYPE;
Let M=initial value;
Let N=M+RAND;
IF N<M, overflow has occurred,
ELSE no overflow has occurred;

A subtle difference between several embodiments is illustrated in the above. As shown, RAND is random, and may, for example, assume the value zero, such that the operation N=M+RAND yields N=M. While in embodiments for use with pure "greater than" functions, such a result would suggest an overflow, however, here the function is a "greater than or equal to" function so that no overflow event has occurred. This illustrates that in some embodiments, the variable and the value may be the same without indicating overflow.

Each of the several illustrative embodiments suggested above may be incorporated, for example, as a subroutine, recallable object, code block, intermediate loop, or as any other part of a computer program. These embodiments are neither platform nor hardware specific, though other embodiments may contain adaptations for use with particular hardware or platforms as desired. Furthermore, the data types illustrated above are not intended to be limiting, as the invention can be used with any data type.

Indeed, as noted above, the present invention can provide a simplification with respect to hardware, eliminating the need to include different hardware mechanisms to accommodate various data type overflows or underflows. For example, while an unsigned integer format may use a simple register carry or turnover monitor flag (for example, flagging 111 to 000 or 000 to 111 events), a twos complement format may monitor carries going into and out of the most significant bit of a register (for example, flagging events where the carry in does not equal the carry out of the most significant bit). As noted above, unsigned integer and twos complement formats may be used, and in other embodiments additional data formats may including signed integer, ones-complement, floating point unbiased exponent, and floating point biased exponent formats, or any other data format. Further, as noted above, text formats and coded character sets may also be manipulated using the methods discussed herein. The present invention allows a single, simple, and in some cases, high level software solution for many different data types and hardware configurations. In other embodiments, these methods may be incorporated into assembly language, microcode, and machine language, or like encodings or programming languages.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for indicating data errors in a data processing system, the method comprising the steps of:
   accepting an initial value in the data processing system;
   generating a new value in the data processing system by applying a function to the initial value;
   comparing the new value to the initial value;
   determining from the comparing step whether a data error has occurred in the data processing system; and
   providing a data error indication in the data processing system if a data error has occurred.

2. The method of claim 1 wherein the function is a monotonically increasing function.

3. The method of claim 2 wherein the comparing step includes determining whether the initial value is greater than the new value, and wherein a data error occurs if the initial value is greater than the new value, and wherein the data error is a data overflow.

4. The method of claim 2 wherein the comparing step includes determining whether the initial value is greater than or equal to the new value, and wherein a data error occurs if the initial value is greater than or equal to the new value, and wherein the data error is a data overflow.

5. The method of claim 1 wherein the function is a monotonically decreasing function.

6. The method of claim 5 wherein the comparing step includes determining whether the initial value is less than the new value, and wherein a data error occurs if the initial value is less than the new value, and wherein the data error is a data underflow.

7. The method of claim 5 wherein the comparing step includes determining whether the initial value is less than or equal to the new value, and wherein a data error occurs if the initial value is less than or equal to the new value, and wherein the data error is a data underflow.

8. A method for indicating data errors in a data processing system, the method comprising:
   storing a data element having a value as a variable in a storage location;
   performing a function on the variable, the function ordinarily causing an increase in the variable when no overflow occurs;
   comparing the value to the variable to determine whether the variable is greater than the value;
   determining that an overflow has occurred if the variable is less than the value; and
   providing a data error indication in the data processing system if an overflow has occurred.

9. The method of claim 8 wherein, if an overflow has occurred, the method further comprises the steps of:
   recording the occurrence of the overflow; and
   setting the data element to a new value that allows the function to be performed without causing an overflow.

10. The method of claim 8 wherein the data element and the variable are in a format chosen from the group consisting of: signed integer format, unsigned integer format, ones-complement format, twos-complement format, and floating point format.

11. The method of claim 8 wherein the function is an increment function.

12. The method of claim 8 wherein the steps are directed by a program written in a high-level programming language.

13. A method for indicating data errors in a data processing system, the method comprising:
   storing a data element having a value as a variable in a storage location;
   performing a function on the variable, the function ordinarily causing a decrease in the variable when no underflow occurs;
   comparing the value to the variable to determine whether the value is greater than the variable; determining that an underflow has occurred if the variable is greater than the value; and
   providing a data error indication in the data processing system if an underflow has occurred.

14. The method of claim 13 wherein, if an underflow has occurred, the method further comprises the steps of:
   recording the occurrence of the underflow; and
   setting the data element to a new value that allows the function to be performed without causing an underflow.

15. The method of claim 13 wherein the value and the variable are in a format chosen from the group consisting of: unsigned integer format, ones-complement format, twos-complement format, and floating point format.

16. The method of claim 13 wherein the function is a decrement function.

17. The method of claim 13 wherein the steps are directed by a program written in a high-level programming language.

18. A method for indicating data errors in a data processing system, the method comprising:
   storing a data element having a value as a variable in a storage location;
   performing a function on the data element, the function ordinarily causing a monotonic increase in the value of the data element when no overflow occurs;
   comparing the value to the variable to determine whether the value is greater than the variable;
   determining that an overflow has occurred if the variable is greater than the value; and
   providing a data error indication in the data processing system if an overflow has occurred.

19. The method of claim 18 wherein, if an overflow has occurred, the method further comprises the steps of:
   recording the occurrence of the overflow; and
   setting the data element to a new value that allows the function to be performed without causing an overflow.

20. The method of claim 18 wherein the value and the variable are in a format chosen from the group consisting of: unsigned integer format, signed integer format, ones-complement format, twos-complement format, unsigned floating point format, signed floating point format, floating point unbiased exponential format, and floating point biased exponential format.

21. The method of claim 18 wherein the function is an increment function.

22. The method of claim 18 wherein the steps are directed by a program written in a high-level programming language.

23. The method of claim 18 wherein the steps are directed by a program written in assembly level language.

24. The method of claim 18 wherein the steps are directed by a program written in microcode.

25. The method of claim 18 wherein the steps are directed by a program implemented as machine code.

26. A method for indicating data errors in a data processing system, the method comprising:
   storing a data element having a value as a variable in a storage location;
   performing a function on the data element, the function ordinarily causing a monotonic decrease in the value of the data element when no underflow occurs;
   comparing the value to the variable to determine whether the value is greater than the variable;
   determining that an overflow has occurred if the value is greater than the variable; and
   providing a data error indication in the data processing system if an overflow has occurred.

27. The method of claim 26 wherein, if an underflow has occurred, the method further comprises the steps of:
   recording the occurrence of the underflow; and
   setting the data element to a new value that allows the function to be performed without causing an underflow.

28. The method of claim 26 wherein the value and the variable are in a format chosen from the group consisting of: unsigned integer format, signed integer format, ones-complement format, twos-complement format, unsigned floating point format, signed floating point format, floating point unbiased exponential format, and floating point biased exponential format.

29. The method of claim 26 wherein the function is a decrement function.

30. The method of claim 26 wherein the steps are directed by a program written in a high-level programming language.

31. The method of claim 26 wherein the steps are directed by a program written in assembly level language.

32. The method of claim 26 wherein the steps are directed by a program written in microcode.

33. The method of claim 26 wherein the steps are directed by a program implemented as machine code.

* * * * *